US006607064B2

(12) United States Patent
Inoue

(10) Patent No.: US 6,607,064 B2
(45) Date of Patent: Aug. 19, 2003

(54) SHALLOW WELLWAY MOVING WALK

(75) Inventor: Takao Inoue, Lebanon, OH (US)

(73) Assignee: Fujitec America Inc., Lebanon, OH (US)

( * ) Notice: Subject to any disclaimer, the term of this patent is extended or adjusted under 35 U.S.C. 154(b) by 0 days.

(21) Appl. No.: 10/053,888

(22) Filed: Jan. 11, 2002

(65) Prior Publication Data

US 2003/0132087 A1 Jul. 17, 2003

(51) Int. Cl.[7] ........................ B65G 15/00; B65G 17/00; B65G 47/66; B66B 29/08; B66B 21/00

(52) U.S. Cl. ........................ 198/324; 198/321; 198/850

(58) Field of Search ................................ 198/321, 324, 198/327, 842, 850; 104/25

(56) References Cited

U.S. PATENT DOCUMENTS 625,905 A * 5/1899 Souder ...................... 198/327
3,247,947 A * 4/1966 Fox et al. .................. 198/325
3,685,635 A * 8/1972 Johnson ...................... 198/324
3,876,061 A * 4/1975 Hammitt .................... 198/792

* cited by examiner

*Primary Examiner*—Christopher P. Ellis
*Assistant Examiner*—Gene O. Crawford
(74) *Attorney, Agent, or Firm*—Frost Brown Todd LLC

(57) ABSTRACT

A moving walkway is shown having a walkway surface with first and second ends and formed of a series of hinged rigid pallets in an endless loop. A direction-reversing sprocket is at each of the first and second ends. Each pallet is hinged to adjacent pallets along an axis substantially transverse to the walkway at opposite ends of the pallets along a length of the endless loop. Each pallet being transversely subdivided into a plurality of parts, each of the pallet parts being unidirectionally hinged to an adjacent one of the plurality of parts such that each pallet will support vertical loads on the walkway surface as a rigid unit and will hinge separately as the endless loop reverses direction around the sprockets.

13 Claims, 8 Drawing Sheets

Fig. 13
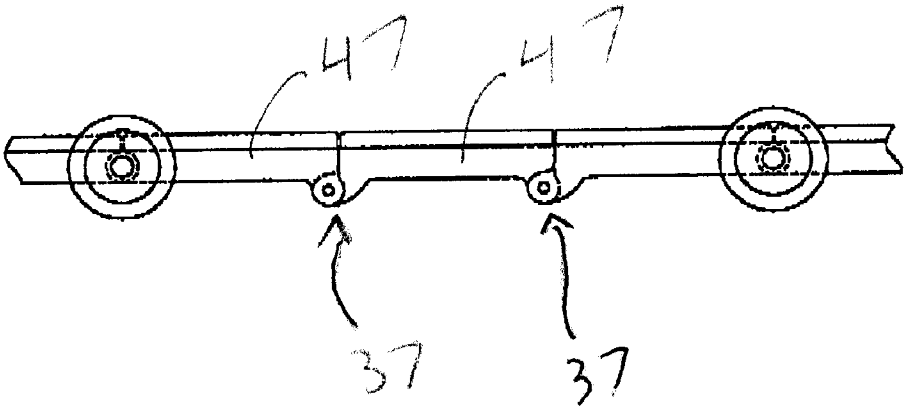
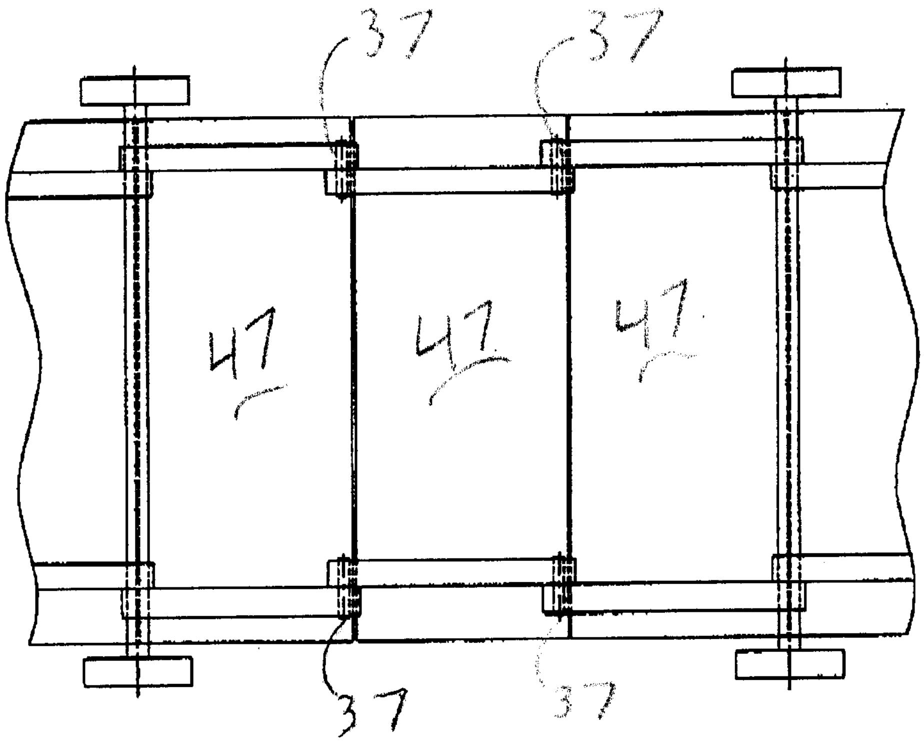
Fig. 14

SHALLOW WELLWAY MOVING WALK

TECHNICAL FIELD

This invention relates to a horizontal moving walkway formed of an endless loop of support pallets. In particular, this invention provides such a walkway requiring less vertical and horizontal space beneath the floor surface.

BACKGROUND OF THE INVENTION

A moving walkway for transporting pedestrians is essentially an endless loop made up of a series of pallets or treads that form the walkway surface. Each pallet is hinged to each adjacent pallet allowing the surface to "bend" as it reverses direction at each end. The series of pallets is carried by a pallet chain which is generally connected to each pallet and the vertical load on each pallet is carried by outboard wheels, usually situated at a hinge joint between adjacent pallets.

The wellway depth required for a horizontal moving walkway of this type is determined primarily by two dimensions: 1) the pallet height, i.e. the effective "thickness" of each pallet, and 2) the diameter of the;,direction-reversing sprockets at each end of the walkway. The diameter of the sprockets is largely determined by the length of each pallet, which limits the effective turning radius of the endless loop.

BRIEF SUMMARY OF THE INVENTION

The present invention addresses each of these limitations by dividing each pallet into multiple pieces using a unidirectional hinge mechanism. This allows the use of a shorter height pallet which will reduce the occupied space in all areas. The total height of the wellway can be reduced by two times the difference of total pallet height. Likewise, the shorter effective length of each pallet will allow the use of smaller diameter drive and tension sprockets, which will, in turn, reduce both the depth And length of the turn-around areas.

The present invention is characterized by a moving walkway having a walkway surface with first and second ends and formed from a series of hinged rigid pallets in an endless loop. A direction-reversing sprocket is located at each of the first and second ends. Each pallet is hinged to adjacent pallets, along an axis which is substantially transverse to the walkway, at opposite ends of the pallets along a length of the endless loop. Each pallet is transversely subdivided into a plurality of parts, each of the pallet parts being unidirectionally hinged to an adjacent one of the plurality of parts such that each pallet will support vertical loads on the walkway surface as a rigid unit and will hinge separately as the endless loop reverses direction around the sprockets.

In preferred form, each pallet is divided into at least three subparts. Other characteristics and features of the invention include the unidirectional hinges having an axis of rotation substantially below the walkway surface and abutment surfaces on leading and edges of each pallet to abut a surface of the adjacent pallet part so as to provide a load-bearing connection therebetween and substantially prevent a downward deflection between adjacent parts by a load on the walkway surface. The abutment surface may extend substantially along the full width of each pallet edge.

In preferred form, the walkway includes main load-supporting bearings (preferably comprising wheels) substantially outboard of the, pallets and substantially adjacent hinged connections between the pallets. The walkway may also include secondary load-support bearing (also preferably wheels) laterally and/or longitudinally between the main support bearings.

The walkway may utilize pallet chains to join the pallets in an endless loop or may utilize hinges between each pallet to join the pallets in an endless loop without pallet chains. In addition, to reduce noise and undesirable stretching, wear resistant synthetic bushings may be used for the hinged pallet embodiment of the present invention.

Other characteristics and features of the invention will become apparent to one skilled in the art upon review of the various figures of the drawing, the detailed description of the best mode for carrying out the invention, and the claims, all of which comprise disclosure of the invention.

BRIEF DESCRIPTION OF THE DRAWING

Like referenced numerals are used to refer to like parts throughout the various figures of the drawing, wherein:

FIG. 13 is a side view of an alternative embodiment of the walkway of the present invention; and FIG. 14 is a top fragmentary view of the alternative embodiment of the walkway shown in FIG. 13.

DETAILED DESCRIPTION OF THE INVENTION

Figure 1:
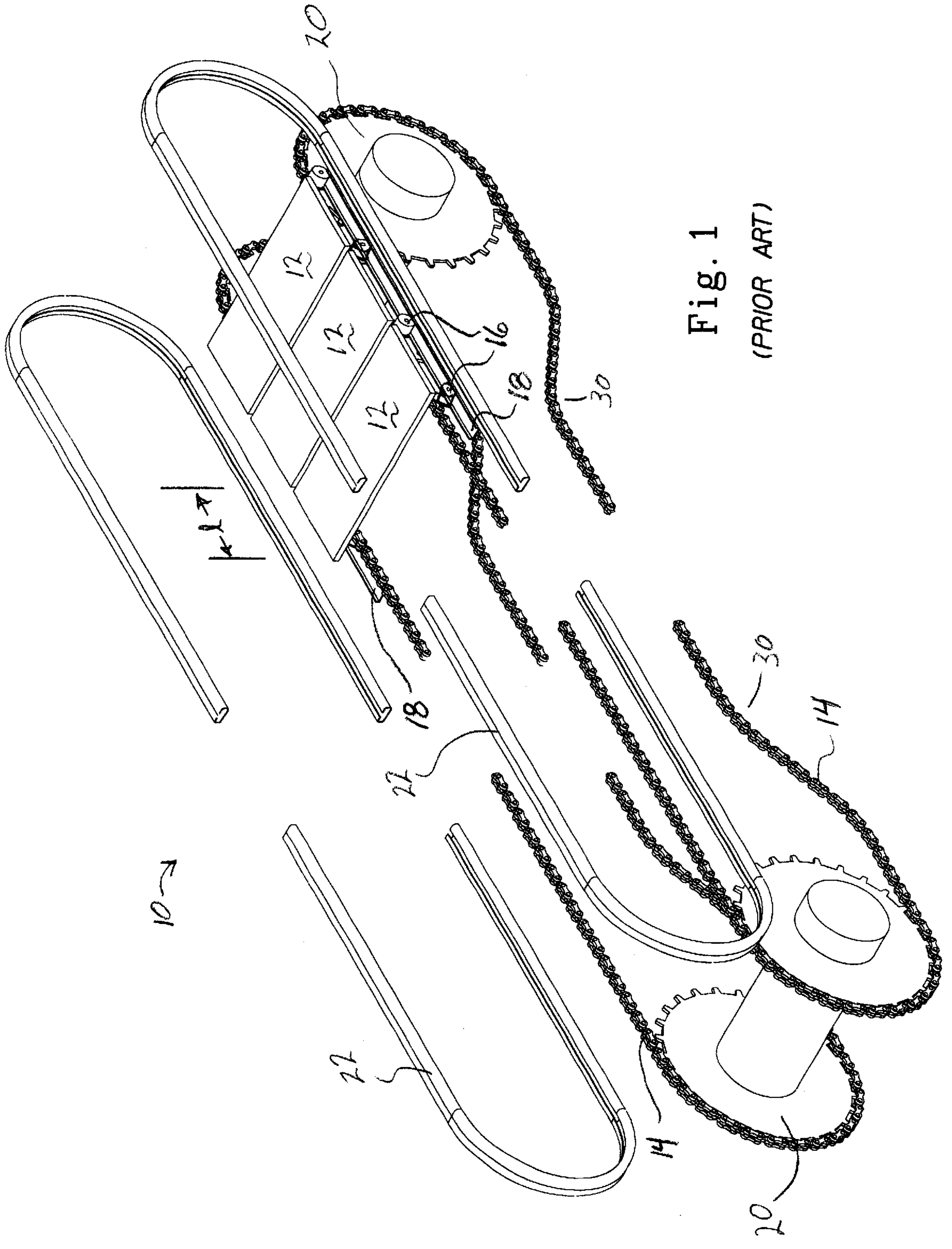
Fig. 1 (PRIOR ART)
FIG. 1 is a fragmentary and partially cut away view of a prior art horizontal moving walk.
Figure 2:
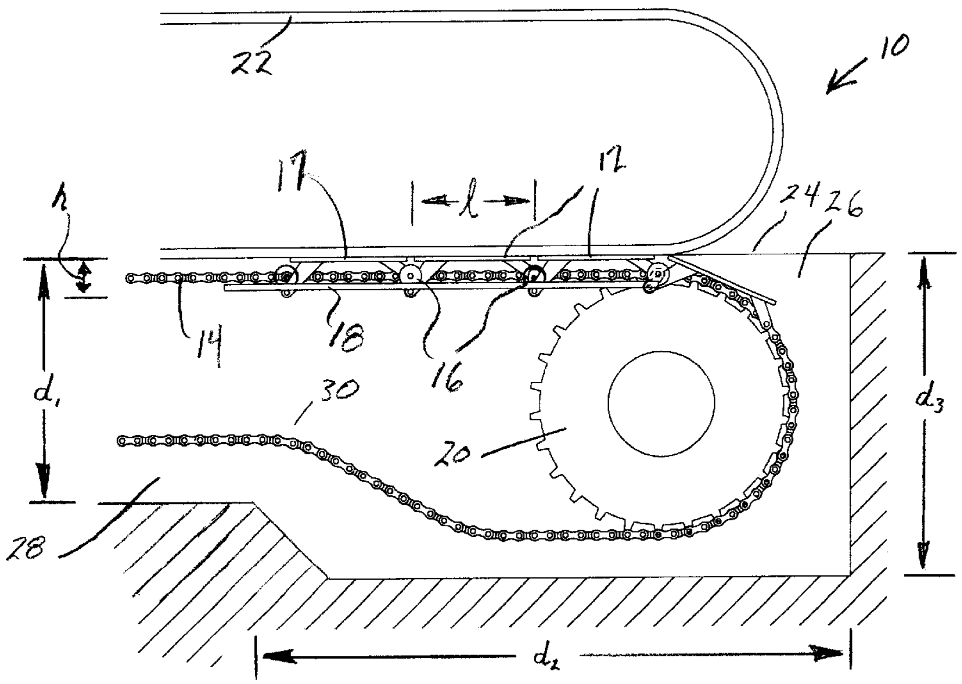
Fig. 2 (PRIOR ART)
FIG. 2 is a partial longitudinal sectional view of a prior art horizontal moving walk.
Figure 3:
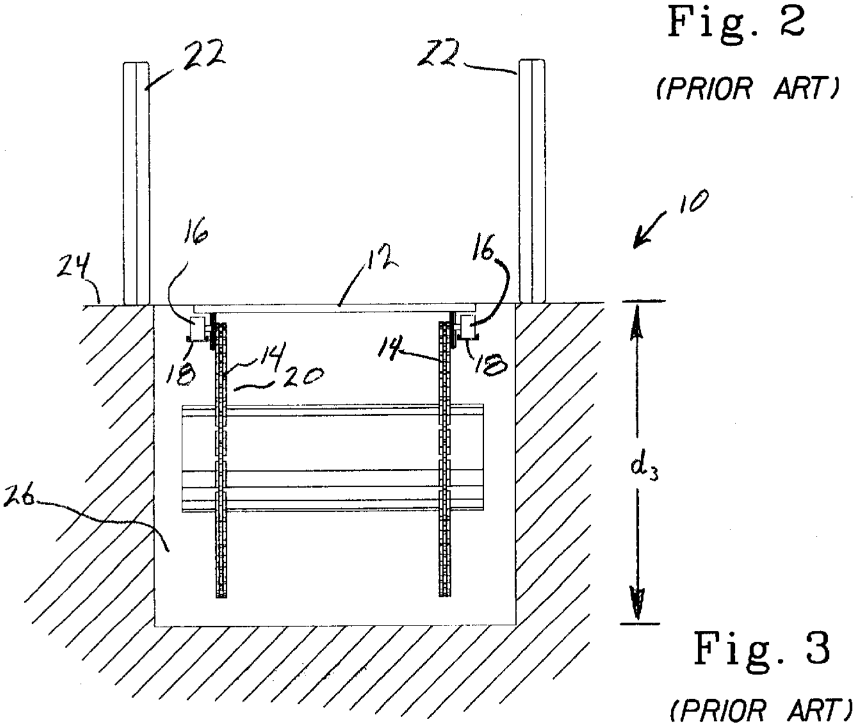
Fig. 3 (PRIOR ART)
FIG. 3 is an end view of a prior art horizontal moving walk.
Figure 4:
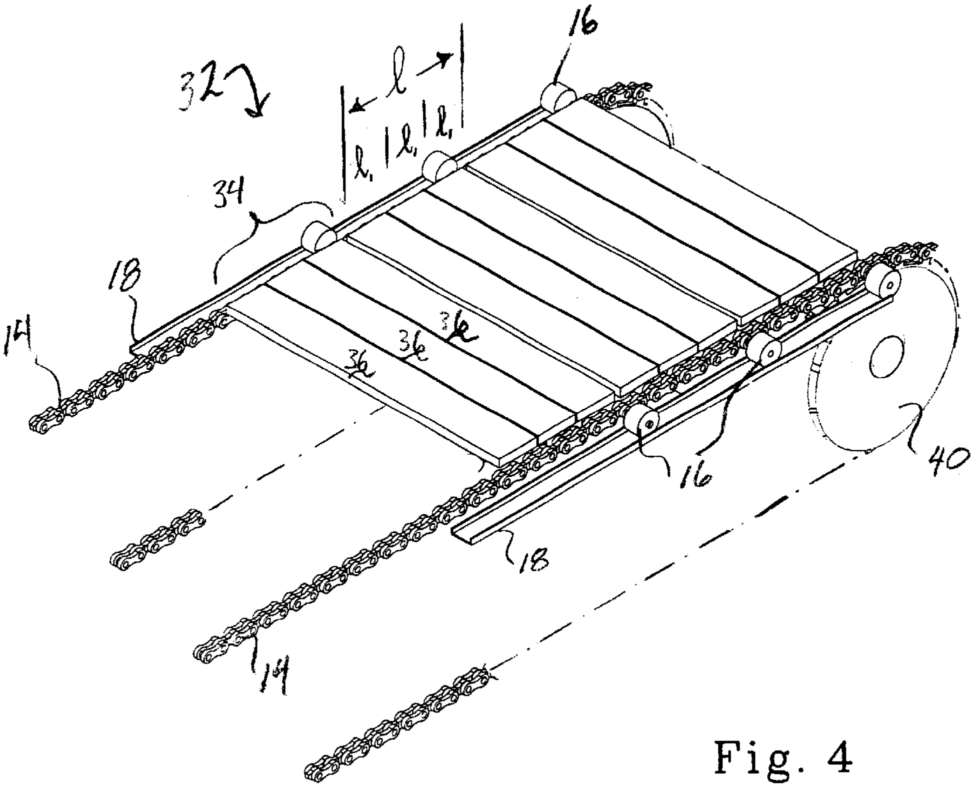
FIG. 4 is a fragmentary, partially cut-away view of a shallow well way horizontal moving walk according to the present invention.
Figure 5:
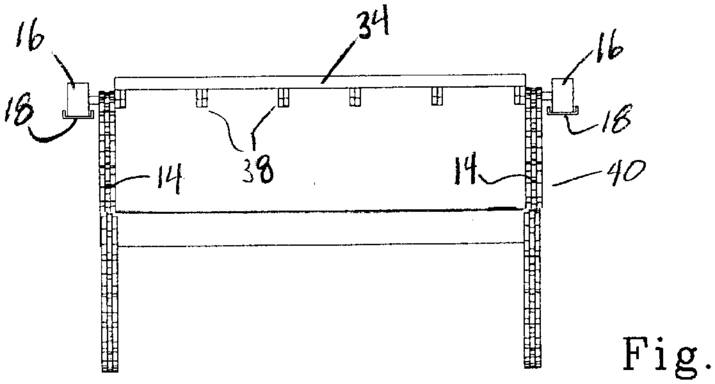
FIG. 5 is an end view of the apparatus shown in FIG. 4.
Figure 6:
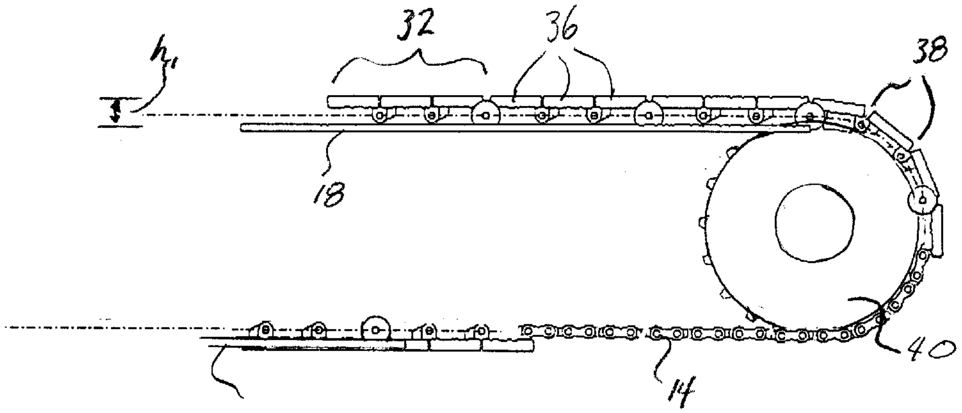
FIG. 6 is a fragmentary, partially cut-away longitudinal sectional view of the apparatus shown in FIGS. 4 and 5.

Referring first to FIGS. 1, 2 and 3, therein is shown at 10 a typical prior art horizontal moving walk. The walk (10) generally comprises a series of treads or pallets (12) attached to pallet chains (14) in an endless loop. The vertical load of the pallets (12) is carried by wheels (16) on opposite sides of each pallet which ride in first and second opposite longitudinal tracts (18). The linear loads are carried by the drive chains (14) which engage sprockets (20) at opposite ends of the walk (10). The linear load can be carried by the hinges connecting each pallet (12) and sprockets (20) that engage each pallet at opposite ends of the walk (10). A drive means (not shown), usually in the form of an electric motor, drives,lone of the sprockets (20), the other one being a tension sprocket. Extending upwardly at each side of the walk (10) are moving hand rails (22) which move in the same direction and at the same linear velocity as the pallets (12), also in an endless loop.

Each pallet (12) has a length (l) and is reversibly hinged to the next pallet (12) in the series at each end thereof. Hinging, of course, is necessary to allow the series of pallets (12) to "bend" around each sprocket and reverse direction at each end of the walk (10). The sprockets (20) and drive means (not shown) are each submerged below floor level (24) in a turn-around well (26). Each turn-around well (26) has a length ($d_l$) and depth ($d_l$) which is determined, in large part, by the diameter of the sprocket (20). The diameter of the sprocket (20) is, in turn, determined largely by the length (l) and height (h) of each pallet (12).

Between each turn-around well (26), along the length of the walk (10) is a raceway (28) having a depth ($d_l$) which is typically less than the depth ($d_l$) of the turn-around well (26). The reduced depth ($d_l$) of the raceway (28) allows the walk (10) to occupy a minimum of vertical space below floor level (24), but also requires that the hinge between adjacent, pallets (12) be reversible such that the continuous loop can "back bend" at point 30.

The present invention allows a reduction in the length ($d_l$) and depth ($d_l$) of the turn-around well (26) as well as a reduction in the depth ($d_l$) of the raceway (28).

To the extent possible, preference numerals identical to those used in the above description of the prior art are used to refer to corresponding parts described in the preferred embodiment below. Referring now to FIGS. 4–9, and first to FIGS. 4, 5 and 6, therein is shown at (32) a shallow wellway horizontal moving walk according to a first preferred embodiment of the invention. Each pallet (34) is divided into multiple pieces (preferably 3) along its length (l). As shown more clearly in FIGS. 7 and 8, each sub-part (36) of each pallet (34) is hinged along its intersection with a non-reversing hinge mechanism (38).

Figure 8:
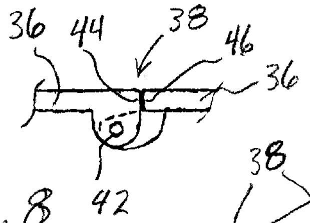
FIG. 8 is a close up of a hinge section according to a preferred embodiment of the present invention.
Figure 7:
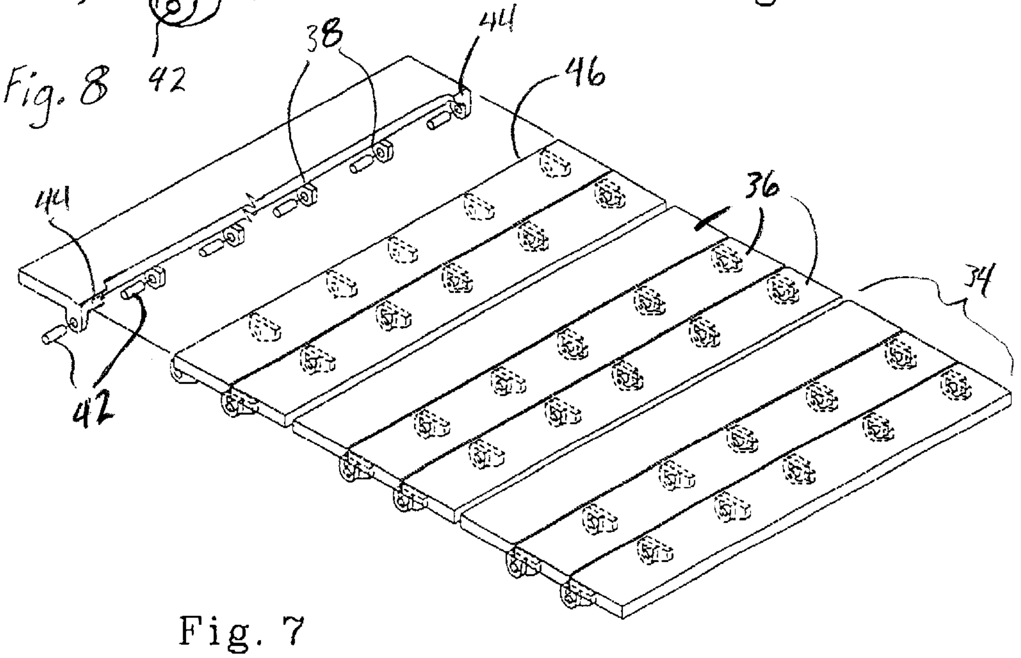
FIG. 7 is a partially exploded and cut-away pictorial view of a series of pallets for the apparatus shown in FIGS. 4, 5 and 6.
Figure 9:
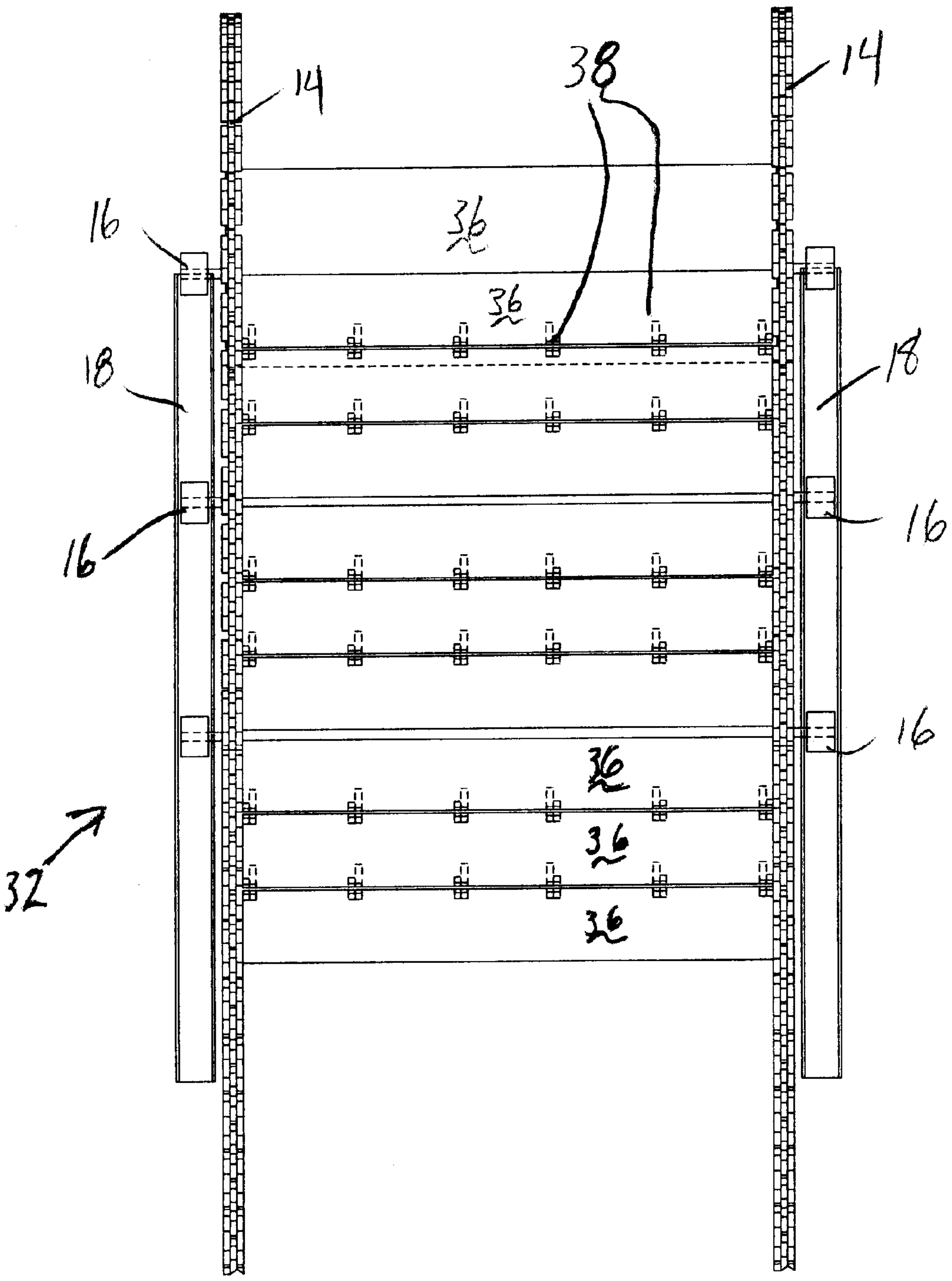
FIG. 9 is a fragmentary top view of the apparatus shown in FIGS. 4, 5 and 6.

Referring now particularly to FIGS. 7 and 8, it can be seen that the non-reversing hinge joint (38) includes a hinge pin (42) which is either offset from (as shown) or centered below the interface between adjacent portions (36) of the pallet or between adjacent pallet members (34). Along each leading and trailing edge is an abutment face (44, 46). By providing a plurality of hinges (38) across the width of each pallet (34), or by providing a continuous hinge, in cooperation with the continuous abutting surfaces (44, 46) across the width of each pallet (34) or pallet section (36), a strong and stiff floor surface, without center deflection, is provided.

Figure 10:
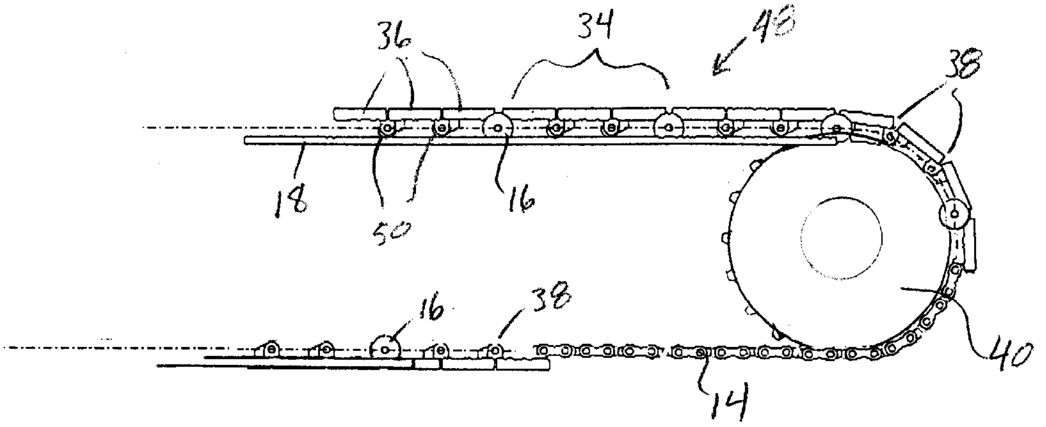
FIG. 10 is a fragmentary, partially cut-away longitudinal sectional view of an alternate embodiment of the present invention.
Figure 11:
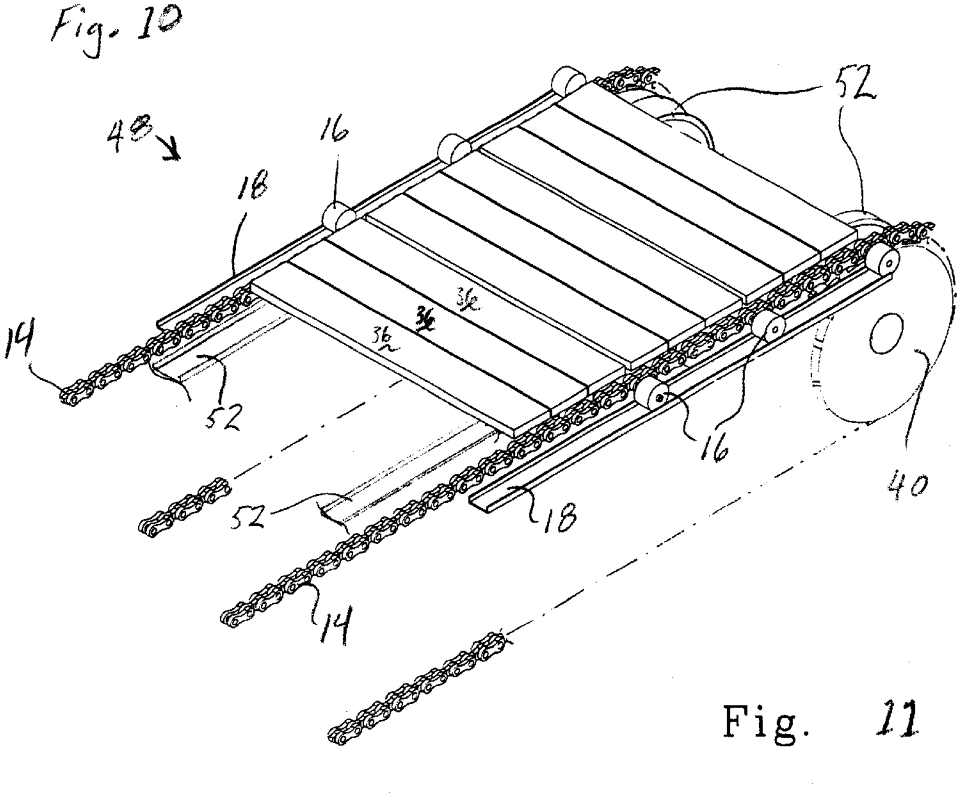
FIG. 11 is a fragmentary, partially cut-away pictorial view of the apparatus shown in FIG. 10.
Figure 12:
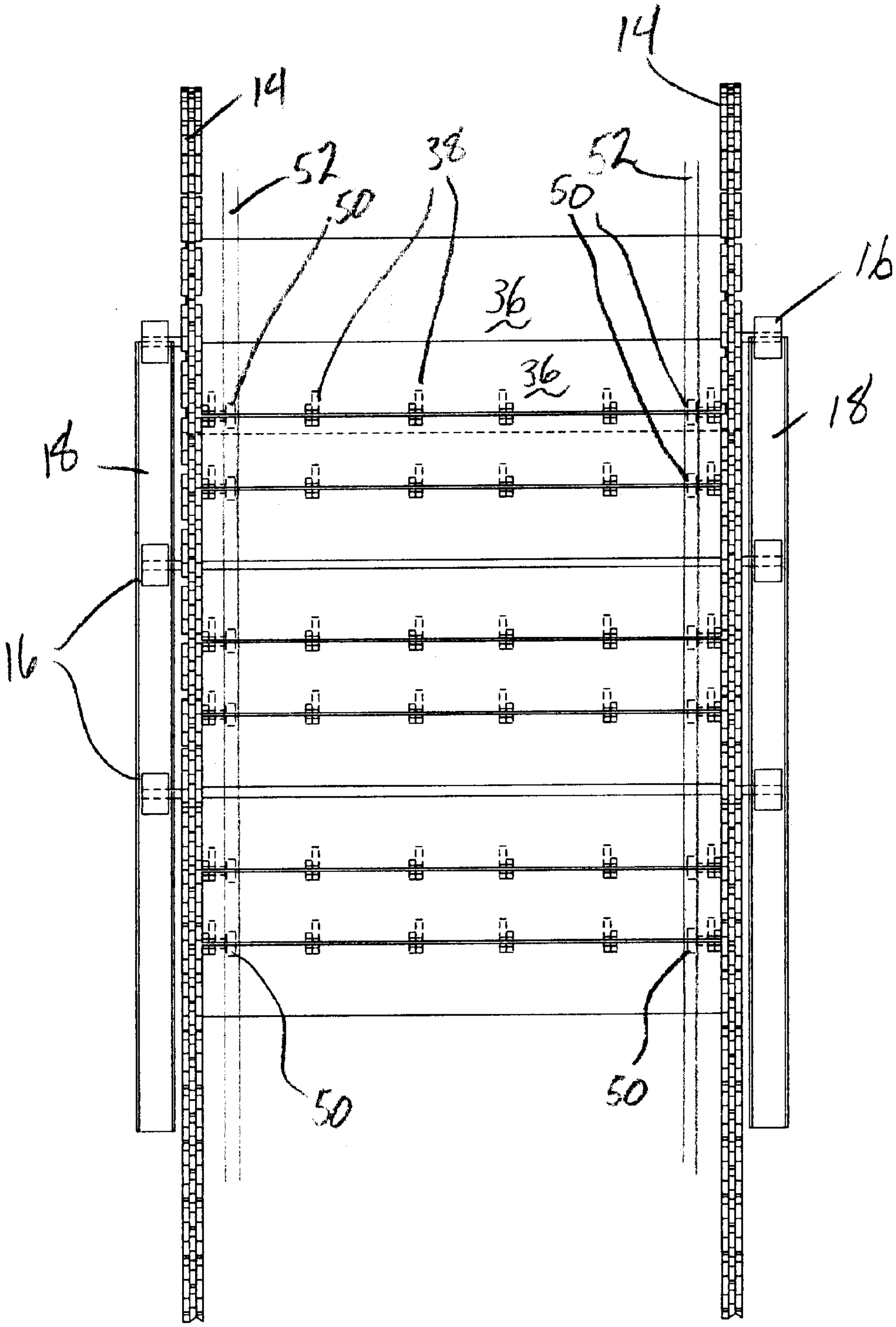
FIG. 12 is a fragmentary top plan view of the apparatus shown in FIGS. 10 and 11.

Referring now to FIGS. 10, 11 and 12, therein is shown at (48) an alternate preferred embodiment of the present invention. This alternate version provides one or more additional rollers (50) across the width of each pallet portion (36). These rollers (50) are supported by corresponding support tracks (52) which, in turn, are supported by frame structure (not shown). This embodiment allows for wider pallets (34) without an increase in the pallet height ($h_1$) or sacrifice in transverse stiffness of the overall floor. Alternatively, this embodiment will allow heavier vertical loads to be carried by a walk (48) of standard width.

Either of the above-disclosed embodiments, although especially the second embodiment shown in FIGS. 10–12, allows the overall length (l) of the pallets (34) to be decreased, and the corresponding distance between rollers (16) to be increased beyond that typically associated with prior art walks. This can result in a reduced number of moving parts and corresponding wear, as well as greatly improve or eliminate chain stretch problems on combined gap area.

The walkway may utilize pallet chains to join the pallets in an endless loop or may utilize hinges (37) between each pallet (47) to join the pallets in an endless loop without pallet chains (FIGS. 13 and 14). In addition, to reduce noise and undesirable stretching, wear resistant synthetic bushings may be used for the hinged pallet embodiment of the present invention.

It is to be understood that many variations and modifications of the disclosed preferred embodiment may be made without departing from the spirit and scope of the inventions. It is to be understood that the invention concept is greater in scope than the embodiments described above and that patent rights are to be defined by the following claim or claims interpreted according to accepted doctrines of claims interpretation, including the doctrine of equivalents and reversal of parts.

What is claimed is:

1. A moving walkway comprising:

a walkway surface having first and second ends and formed of a series of hinged rigid pallets in an endless loop;

a direction-reversing sprocket at each of the first and second ends;

each pallet being hinged to adjacent pallets along an axis substantially transverse to the walkway at opposite ends of the pallets along a length of the endless loop;

and each pallet being transversely subdivided into a plurality of parts, each of the pallet parts being unidirectionally hinged to an adjacent one of the plurality of parts such that each pallet will support vertical loads on the walkway surface as a rigid unit and will hinge separately as the endless loop reverses direction around the sprockets.

2. The moving walkway of claim 1, wherein each pallet is subdivided into at least three parts.

3. The moving walkway of claim 2, wherein each unidirectional hinge has an axis of rotation situated below the walkway surface and each pallet part includes an abutment surface to abut a surface of the adjacent pallet part so as to provide a load-bearing connection therebetween and substantially prevent a downward deflection between adjacent parts by a load on the walkway surface.

4. The moving walkway of claim 1, wherein each unidirectional hinge has an axis of rotation situated below the walkway surface and each pallet part includes an abutment surface to abut a surface of the adjacent pallet part so as to provide a load-bearing connection therebetween and substantially prevent a downward deflection between adjacent parts by a load on the walkway surface.

5. The moving walkway of claim 4, wherein each pallet part includes a substantially full width abutment surface along the edges between adjacent pallet parts at the unidirectionally hinged connection.

6. The moving walkway of claim 4, further comprising a unidirectional hinge connection between adjacent pallets.

7. The moving walkway of claim 6, further comprising main load-supporting bearings substantially outboard of the pallet and substantially adjacent hinged connections between the pallets.

8. The moving walkway of claim 1, further comprising main load-supporting bearings substantially outboard of the pallet and substantially adjacent hinged connections between the pallets.

9. The moving walkway of claim 8, wherein the main load-supporting bearings comprise wheels.

10. The moving walkway of claim 8, further comprising secondary load-supporting bearings on at least some pallets intermediate of the main load-supporting bearings.

11. The moving walkway of claim 10, wherein the secondary load-supporting bearings are positioned longitudinally between leading and trailing edges of at least some pallets.

12. The moving walkway of claim 10, wherein the secondary load-supporting bearings comprise wheels.

13. The moving walkway of claim 12, wherein the secondary load-supporting bearings are positioned inboard between side edges of the pallets.

* * * * *